US010595075B2

United States Patent
Beardsley et al.

(10) Patent No.: US 10,595,075 B2
(45) Date of Patent: Mar. 17, 2020

(54) AUTOMATIC TIMING OF PRODUCTION DEVICES IN AN INTERNET PROTOCOL ENVIRONMENT

(71) Applicant: Disney Enterprises, Inc., Burbank, CA (US)

(72) Inventors: Craig L. Beardsley, Chicago, IL (US); Michael J. Strein, Bohemia, NY (US)

(73) Assignee: Disney Enterprises, Inc., Burbank, CA (US)

( * ) Notice: Subject to any disclaimer, the term of this patent is extended or adjusted under 35 U.S.C. 154(b) by 224 days.

(21) Appl. No.: 15/669,463

(22) Filed: Aug. 4, 2017

(65) Prior Publication Data
US 2019/0045259 A1 Feb. 7, 2019

(51) Int. Cl.
| | |
|---|---|
| H04N 21/00 | (2011.01) |
| H04N 21/43 | (2011.01) |
| H04L 29/06 | (2006.01) |
| H04N 21/242 | (2011.01) |
| G06F 1/12 | (2006.01) |
| H04N 21/643 | (2011.01) |
| H04N 21/61 | (2011.01) |

(52) U.S. Cl.
CPC .......... *H04N 21/4305* (2013.01); *G06F 1/12* (2013.01); *H04L 65/4076* (2013.01); *H04L 65/80* (2013.01); *H04N 21/242* (2013.01); *H04N 21/64322* (2013.01); *H04L 65/4084* (2013.01); *H04N 21/6125* (2013.01)

(58) Field of Classification Search
None
See application file for complete search history.

(56) References Cited

U.S. PATENT DOCUMENTS

| | | | | |
|---|---|---|---|---|
| 6,069,666 A | * | 5/2000 | Lyons | H04N 5/126 348/512 |
| 6,370,159 B1 | * | 4/2002 | Eidson | G06F 1/14 370/503 |
| 6,515,708 B1 | * | 2/2003 | Kato | H04N 5/126 348/524 |

(Continued)

OTHER PUBLICATIONS

U.S. Appl. No. 15/596,425 entitled "Providing Common Point of Control and Configuration in IP-Based Timing Systems," filed May 16, 2017.

*Primary Examiner* — Dave Czekaj
*Assistant Examiner* — Shanika M Brumfield
(74) *Attorney, Agent, or Firm* — Patterson + Sheridan, LLP

(57) ABSTRACT

Embodiments herein describe automatically synchronizing the output of source devices connected to a system reference point through an IP network in a media production studio so that the outputs are aligned when they reach the system reference point. In one embodiment, the system reference point device exchanges a plurality of messages and timestamps with a source device. The source device uses the messages and timestamps to determine a transmission delay between the source device and the system reference point device. The source device uses the transmission delay to determine a video transmission correction factor, which the source device applies to modify the time at which it outputs a signal so that the signal is aligned with signals output by other source devices when the signal arrives at the system reference point device through the IP network.

23 Claims, 6 Drawing Sheets

(56) References Cited

U.S. PATENT DOCUMENTS

| | | | |
|---|---|---|---|
| 8,730,867 B2* | 5/2014 | Defrance | H04J 3/0697 |
| | | | 370/324 |
| 2010/0074278 A1* | 3/2010 | Dobjelevski | H04J 3/0673 |
| | | | 370/503 |
| 2016/0211935 A1* | 7/2016 | Fair | G06F 1/12 |
| 2016/0352500 A1* | 12/2016 | Benjamini | H04L 7/04 |
| 2017/0064154 A1* | 3/2017 | Tseng | H04N 5/04 |
| 2017/0359139 A1* | 12/2017 | Butterworth | H04J 3/0661 |
| 2018/0077444 A1* | 3/2018 | Fankhauser | H04N 21/64322 |
| 2018/0262655 A1* | 9/2018 | Kumar | H04N 5/04 |

* cited by examiner

AUTOMATIC TIMING OF PRODUCTION DEVICES IN AN INTERNET PROTOCOL ENVIRONMENT

BACKGROUND

Field of the Invention

The embodiments herein are generally directed to automating the timing of output from production source devices that use an internet protocol (IP) network to communicate with a system reference point in a media production studio.

Description of the Related Art

Media production studios (e.g., television studios or film studios) typically include a video production system with several different source devices, like cameras, video players, graphic devices, etc., and a reference point device, like a video switcher. In these production studios, each source device that is used in the production must have its video output timed to arrive at the video switcher so that the video signals (frames, lines and pixels) of each device are aligned to each other and to the switcher's internal clock. In traditional systems, each source device is directly connected to the reference device, for example through a coaxial cable. The output timing of the signal from the source devices must be adjusted to compensate for latency in signal transmission due to factors like cable lengths between the source device and the video switcher, drift in the stability of the internal synchronization of devices to a reference clock, and the varying assignment of production resources to various studios and productions.

Traditionally, this adjustment was done manually. A technician would manually adjust the phase and delay of the video signal leaving each source device, based on verbal instructions from another technician watching the video signals on a video scope. More recently, many systems include a small auto-timing window, where as long as the source signals are within a pre-defined time period (for example, within +/−½ of a line), the reference device can align the signals automatically. With both approaches, aligning the video signals is time and labor intensive, and must be repeated as part of routine maintenance procedures, each time the configuration of the media production studio is changed, and when devices are added to the media production studio.

SUMMARY

One embodiment described herein is a method that includes generating one or more timestamps at a system reference point device and each of a plurality of source devices, where the plurality of source devices are communicatively coupled to the system reference point device via an Internet Protocol (IP) network. The method includes determining a transmission delay between each of the source devices and the system reference point device over the IP network by exchanging the timestamps. The method includes determining a video transmission correction factor for a first source device of the plurality of source devices, based on the transmission delay for the first source device. The method includes modifying, based on the video transmission correction factor, a time at which transmission of a first video signal is initiated from the first source device to the system reference point device over the IP network.

Another embodiment described herein is a non-transitory computer readable storage medium that includes computer-readable program code for determining a video transmission correction factor, where, when executed by a computer processor, the computer-readable program code performs an operation. The operation includes generating one or more timestamps at a system reference point device and a plurality of source devices, where the plurality of source devices are communicatively coupled to the system reference point device via an Internet Protocol (IP) network. The operation includes determining a transmission delay between each of the source devices and the system reference point device over the IP network by exchanging the timestamps. The operation includes determining a video transmission correction factor for a first source device of the plurality of source devices, based on the transmission delay for the first source device. The operation includes modifying, based on the video transmission correction factor, a time at which transmission of a first video signal is initiated from the first source device to the system reference point device over the IP network.

Another embodiment described herein is a media production studio that includes a system reference point device, an Internet Protocol (IP) network, and a plurality of source devices communicatively coupled to the system reference point device over the IP network in the media production studio, where the system reference point device and each of the source devices are configured to generate one or more timestamps, where each of the source devices is configured to determine a transmission delay between the source device and the system reference point device over the IP network by exchanging the timestamps. The media production studio includes a first source device of the plurality of source devices that is configured to determine a video transmission correction factor based on the transmission delay between the first source device and the system reference point device, and that is configured to modify, based on the video transmission correction factor, a time at which the first source device initiates transmission of a first video signal to the system reference point device over the IP network.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Embodiments herein describe synchronizing the output of source devices in a media production studio so that signals transmitted by the source devices to a system reference point device through an IP network are aligned when they reach the system network device. Typically, in an IP production environment, all source devices derive their timing reference from a common master source, such that the timing of the internal clocks in all the devices is accurately synchronized. A protocol based on the Precision Time Protocol (PTP) can be used for this clock synchronization. But this does not align the signals at the reference device. The latencies stemming from transmission between a source device and a reference device over an IP network are not taken into account by PTP, and these latencies can cause the signals from different source devices to be mis-aligned at the reference device, leading to a variety of timing errors.

In one embodiment, a system reference point device exchanges a plurality of messages and timestamps with each source device. The source device then uses those messages and timestamps to determine an average transmission delay between the source device and the system reference point device. The source device uses the average transmission delay to determine a video transmission correction factor, which the source device applies to modify the time that it outputs the video signal so that the video signal is aligned with video signals output by other source devices when the video signal arrives at the system reference point device through the IP network. Methods other than this embodiment may be employed to measure the transmission delay.

In one embodiment, the system reference point device exchanges with each source device a Sync message, a Delay Request message, and a Delay Response message. Each source devices determines the transmission time for the Sync message and Delay request message, and uses that to determine a transmission delay between the source device and system reference point device. This determination assumes that the internal clock of each source device is synchronized with the internal clock of the system reference point device. This clock synchronization is described with reference to FIG. 1 herein, and in application Ser. No. 15/596,425 herein incorporated by reference.

In one embodiment, the source device determines the video transmission correction factor using the transmission delay, along with the frame rate of the video signal and a color framing attribute. Color framing is used where signals are eventually converted to analog composite video. In this embodiment, if the video signal includes color framing, the source device determines a color framing factor based on the frame rate of the video and the color framing attribute, and uses the color framing factor when determining the video transmission correction factor.

Figure 1:
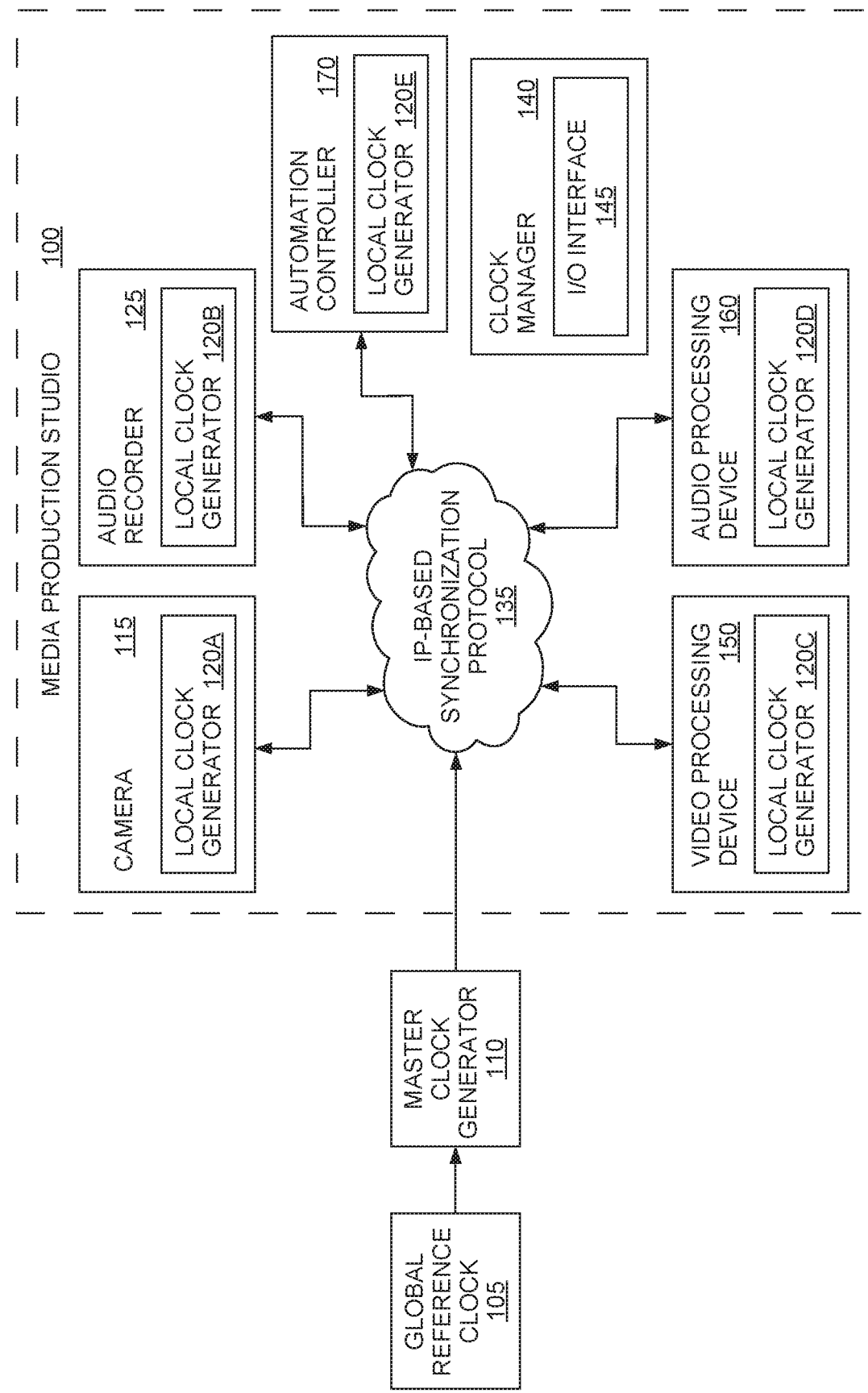
FIG. 1 illustrates a system for synchronizing clocks in a media production studio, according to one embodiment described herein.

FIG. 1 illustrates a system for synchronizing clocks in a media production studio 100. In one embodiment, media production studios use an analog black burst and a Society of Motion Picture & Television Engineers (SMPTE) time-code based timing reference system for generating time codes for streaming videos. Alternatively, a media production studio can use an IP-based synchronization protocol as illustrated in FIG. 1. The embodiments herein for identifying latency between source devices (also referred to herein as endpoint devices) and a system reference point device can be used in media production studios that use analog or IP-based synchronization means to synchronize clocks and generate time codes.

The media production studio 100 receives a master clock signal from a master clock generator 110 which is distributed using an IP-based synchronization protocol 135. For example, the IP-based synchronization protocol 135 can be the Precision Time Protocol (PTP) which can synchronize clocks through a computer network. PTP is typically used in communication networks such as cellular networks and is defined in IEEE Standard 1588. However, SMPTE 2059 has adapted PTP to be used in professional broadcast applications such as the media production studio 100. Alternatively, any other IP-based synchronization protocols can be used such as, for example, updated or new versions of PTP or the Network Time Protocol (NTP).

The master clock generator 110 receives an input from a global reference clock 105 which is used to generate a master clock signal transmitted to the IP-based synchronization protocol 135. For example, the global reference clock 105 can be a global positioning clock (GPS) which is transmitted from satellites. Although not shown, the master clock generator 110 may include a GPS receiver for receiving the global reference clock 105. GPS provides a very accurate clock frequency that the master clock generator 110 can use to output the master clock.

The IP-based synchronization protocol 135 can use an IP network to distribute the master clock digitally throughout the media production studio 100. In this example, the media production studio 100 includes a camera 115, an audio recorder 125, a video processing device 150, an audio processing device 160, and an automation controller 170 (referred to generally as endpoint devices). However, the IP-based synchronization protocol 135 can distribute the master clock to any endpoint device which generates, mixes, switches, edits, or otherwise processes video or audio data.

Each of the endpoint devices in FIG. 1 (i.e., the camera 115, the audio recorder 125, the video processing device 150, the audio processing device 160, and the automation controller 170) include a local clock generator 120 which receives the master clock distributed by the IP-based synchronization protocol 135. The local clock generators 120 output local clock signals that are used to uniquely identify video frames or audio segments as well as perform phasing so that different streams can be mixed. In one embodiment, the local clock generators 120 may convert a master clock in international atomic time into a UTC time which considers time zones and leap seconds. The local clock generators 120 can also generate unique time codes (or frame codes) that can be assigned to a particular frame. For example, as the camera 115 captures video frames, the camera 115 can use the time codes generated by the local clock generator 120A to assign a unique time code to each of the generated video frames. Although not shown in FIG. 1, the video frames can be transmitted between the endpoint devices—e.g., from the camera 115 to the video processing device 150—using an IP data network which may be the same network used by the IP-based synchronization protocol to transmit the master clock. The time code informs the endpoint device receiving the video frame precisely when the frame was captured by the camera 115 which can be used to synchronize the frame to other video streams or an audio stream. The automation controller 170 uses the time codes generated by the local clock generator 120E to queue and play media content (e.g., pre-recorded shows and live content) according to a pre-defined broadcast schedule. That is, the automation controller 170 may use the time codes to control other systems and devices in the media production studio 100 so that the broadcast schedule is followed.

The local clock generators 120 can output a phasing signal that can be used when mixing video streams. For example, the video processing device 150 may receive two video streams from two different cameras. In order to properly mix the video streams, the first pixel on the first line in the frames in each of the video streams may need to be received at the same time. By generating the phasing signal from the master clock, the media production studio 100 can minimize offset errors when mixing streams.

One disadvantage of using the IP-based synchronization protocol 135 and the local clock generators 120 is that the system does not have a common point of control like in traditional synchronization systems. For example, when using black burst or other analog synchronization protocols, changes to the master clock are automatically reflected in changes to the local clock signals in the endpoint devices. However, with the IP-based synchronization protocol 135, the local clock generators 120 are not slaved to the master clock such that changes in the master clock do not result in an immediate or automatic change in the local clock signals in the endpoint devices. That is, an engineer could use the master clock generator 110 to change the current value of the master clock, but this change is not reflected in the endpoint devices until these devices reach the predefined jam time when the local clock generators 120 resynchronize the local clock signals to the master clock. However, the jam time could occur once daily which means it could be hours before the change to the master clock is propagated to the local clock signals.

To provide a common control point, the media production studio 100 includes a clock manager 140 which includes an I/O interface 145 for receiving timing adjustments from a person (e.g., an engineer or producer) or a software application. Although not shown in FIG. 1, the clock manager 140 is communicatively coupled to each of the endpoint devices such that the clock manager 140 can update one or more parameters in the local clock generators 120. For example, the clock manager 140 may use a wide access network (WAN) or a local access network (LAN) to send instructions to the local clock generators 120.

When an engineer or software application wants to adjust the local clock signals on the endpoint devices, the engineer or application can provide a timing adjustment using the I/O interface 145. In response, the clock manager 140 can push out an instruction to one or all of the endpoint devices to change the operation of the local clock generators 120. In this manner, the clock manager 140 provides a common control point for the endpoint devices in the media production studio 100.

The media production studio 100 may be a building or multiple buildings distributed on a campus. In another embodiment, the media production studio 100 can include a plurality of different locations that each can include one or more buildings that are interconnected by an IP based communication network. For example, the media production studio 100 can include buildings and endpoint devices that are in different time zones or different countries that are communicatively coupled so the endpoint devices can share video and/or audio streams and have synchronized clocks using the IP-based synchronization protocol 135.

Figure 2:
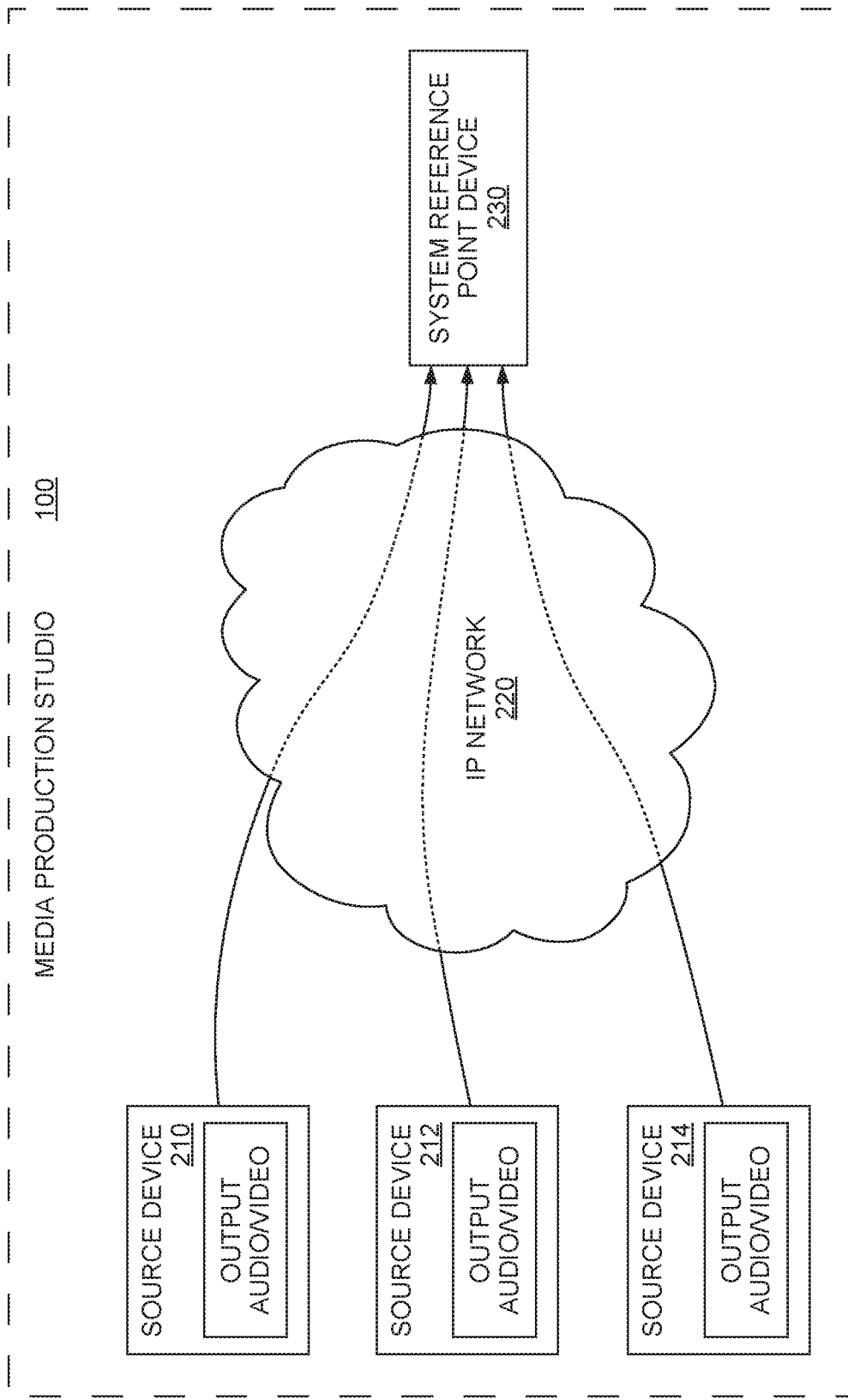
FIG. 2 illustrates a media production studio with a plurality of source devices communicatively coupled to a system reference point device through an IP network, according to one embodiment described herein.

FIG. 2 illustrates another example of the media production studio 100, according to one embodiment described herein. The media production studio 100 includes a plurality of source devices, 210, 212 and 214. A source device is an example of an endpoint device, as described in relation to FIG. 1, and can include a camera, video player, graphic device, or any other device that outputs video and/or audio. The source devices 210, 212 and 214 are communicatively coupled to a system reference point device 230 through an IP Network 220. The IP Network 220 can be any IP Network, including a wide area network (WAN), a local area network (LAN) or the internet. The system reference point device 230 receives video and/or audio signals from one or more source devices and can be, for example, a mixer, a switcher, or any other suitable device. The source devices 210, 212 and 214 transmit the video and/or audio signals to the system reference point device 230 through the IP network 220.

In one embodiment, the output from each of the source devices 210, 212 and 214 are timed to arrive at the system reference point device 230 so that the signals output by each source device are aligned with each other and with the internal clock of the system reference point device 230. For example, if source devices 210, 212 and 214 output video, the video output from each source device is timed so that the frames, lines and pixels of each video signal are aligned when they reach the system reference point device 230. In a traditional media production studio, as described above, the system reference point device could be connected directly to each of the source devices through, for example, a coaxial cable. To synchronize the outputs from each of the source devices, a technician would manually adjust the phase and delay of the video leaving each output device, while another technician watched the signals on a video scope. In many modern digital systems, the system reference point device can automatically compensate for a small offset between video signals. For example, many systems can compensate for an offset of one line. But prior systems cannot automatically compensate for a larger offset.

In the media production studio 100 illustrated in FIG. 2 each of the source devices 210, 212 and 214 are connected to the system reference point device 230 through an IP Network 220. This means that the path between each source device and the system reference point device 230 can vary widely, depending on the network configuration, and therefore the transmission time for signals from each source device to the system reference point device 230 can also vary widely. Embodiments herein describe a protocol that can be used to determine the delay between each of source devices 210, 212 and 214 and system reference point device 230, and can determine a video transmission correction factor, based on this delay, that can be used to ensure the video from each source device is aligned at the system reference point device.

Figure 3:
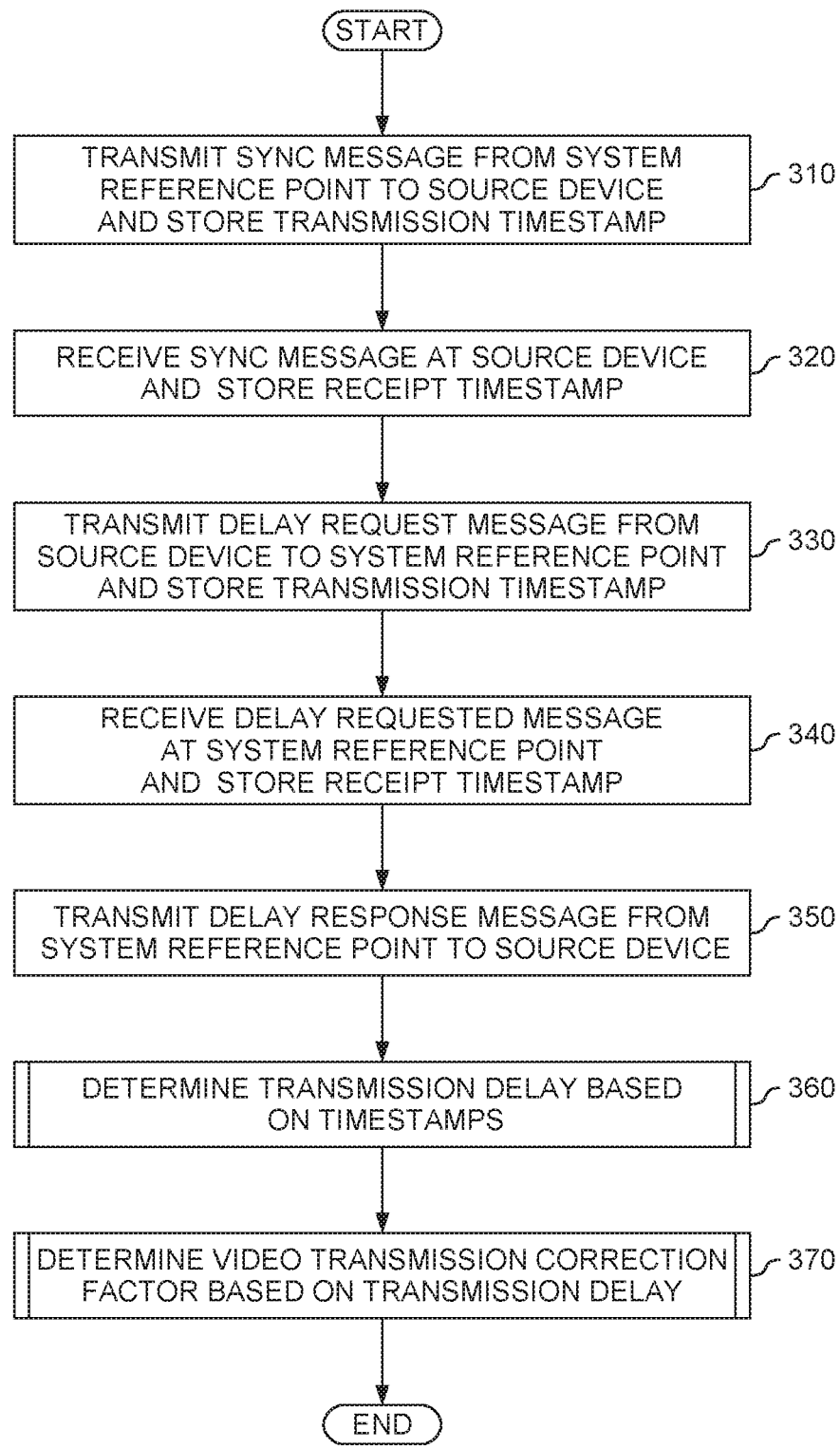
FIG. 3 is a flowchart for determining a transmission delay and video transmission correction factor for aligning video signals transmitted from a source device to a system reference point device, according to one embodiment described herein.
Figure 4:
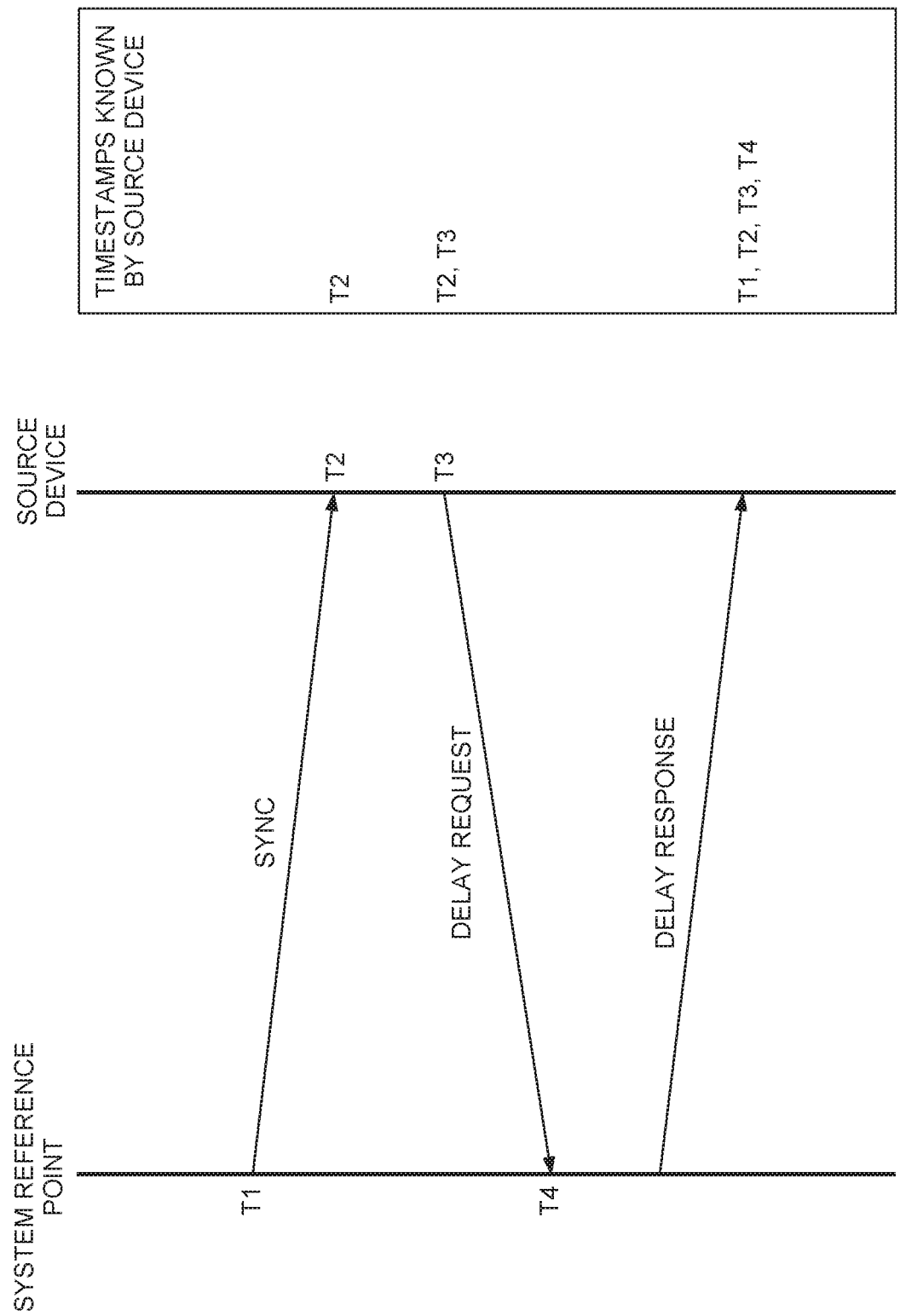
FIG. 4 is a diagram for determining the transmission delay between a source device and a system reference point device, according to one embodiment described herein.

FIG. 3 is a flowchart of a method for determining the network transmission delay between the source device 210 and the system reference point device 230, and then using this determined delay to determine a video transmission correction factor, according to one embodiment. FIG. 4 is a diagram illustrating part of this method. For convenience, FIGS. 3 and 4 are discussed together. The method illustrated in FIGS. 3 and 4 assumes that the clock on each source device has been synchronized with the clock on the system reference point device. An example synchronization process is described herein with reference to FIG. 1.

At step 310, the system reference point device transmits a Sync message to the source device over the IP network (e.g., the IP network 220 shown in FIG. 2). The system reference point device can transmit the Sync message to a specific source device by sending it to a known IP address for that source device. The system reference point device can also transmit the Sync message to a plurality of source devices by sending the message to a multicast address corresponding to the plurality of source devices. The system reference point device stores locally a timestamp, T1, representing the time at which the system reference point device transmits the Sync message.

At step 320, the source device receives the Sync message from the system reference point device. The source device stores locally a timestamp, T2, representing the time at which the source device received the Sync message. At step 330, the source device transmits a Delay Request message to the system reference point device. The source device stores locally a timestamp, T3, representing the time at which the source device transmits the Delay Request message.

At step 340, the system reference point device receives the Delay Request message. The system reference point device stores locally a timestamp, T4, representing the time at which it received the Delay Request message. At step 350, the system reference point device transmits a Delay Response message to the source device. This Delay Response message includes the timestamp T1 (representing the time at which the system reference point device transmitted the Sync message), and the timestamp T4, representing the time at which the system reference point device received the Delay Request message.

At step 360, the source device receives the Delay Response message and uses the timestamps T1, T2, T3, and T4 to determine the transmission delay between it and the system reference point device. This is described in more detail with reference to FIG. 5, herein. At step 370, the source device uses the transmission delay determined at step 360 to determine a video transmission correction factor. This is described in more detail with reference to FIG. 6, herein. The source device can then use this correction factor to appropriately modify the time at which it outputs the video signal to ensure that its transmitted video signal is aligned on arrival with video signals from other source devices in the media production studio.

Because the method illustrated in FIGS. 3 and 4 assumes that the clock on each device has been synchronized, the method does not need to include an Announce message and does need to build a clock hierarchy, both of which are included in PTP. Further, because the transmission delay between the source devices and the system reference point device is typically relatively stable, the method illustrated in FIGS. 3 and 4 does not need to be performed as frequently as clock synchronization using PTP. For example, the method illustrated in FIGS. 3 and 4 could be performed once every few seconds, or even less frequently, rather than twice per second as is typical for PTP. In addition, the method illustrated in FIGS. 3 and 4 is initiated by the system reference point device, not the source device.

Figure 5:
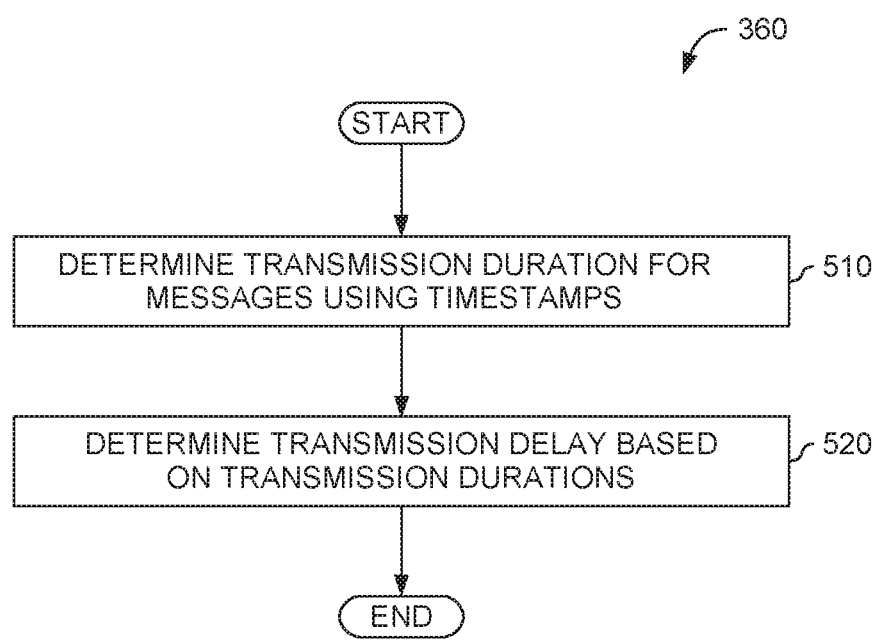
FIG. 5 is a flowchart for determining a transmission delay between a source device and a system reference point device, according to one embodiment described herein.

FIG. 5 is a flow chart illustrating step 360 according to an embodiment. At step 510, the source device determines the transmission duration for the messages exchanged with the system reference point device. For example, the difference between times T2 and T1 represents the transmission time for the Sync message, while the difference between times T4 and T3 represents the transmission time for the Delay Request message. At step 520, the source device uses the transmission durations to determine the transmission delay.

For example, the source device can determine the transmission duration for the Sync and Delay Request messages and can use this to determine an average transmission delay between the source device and the system reference point. In one embodiment, the source device can use typical hysteresis and smoothing method to more accurately determine the transmission delay based on the four timestamps T1, T2, T3, and T4.

Figure 6:
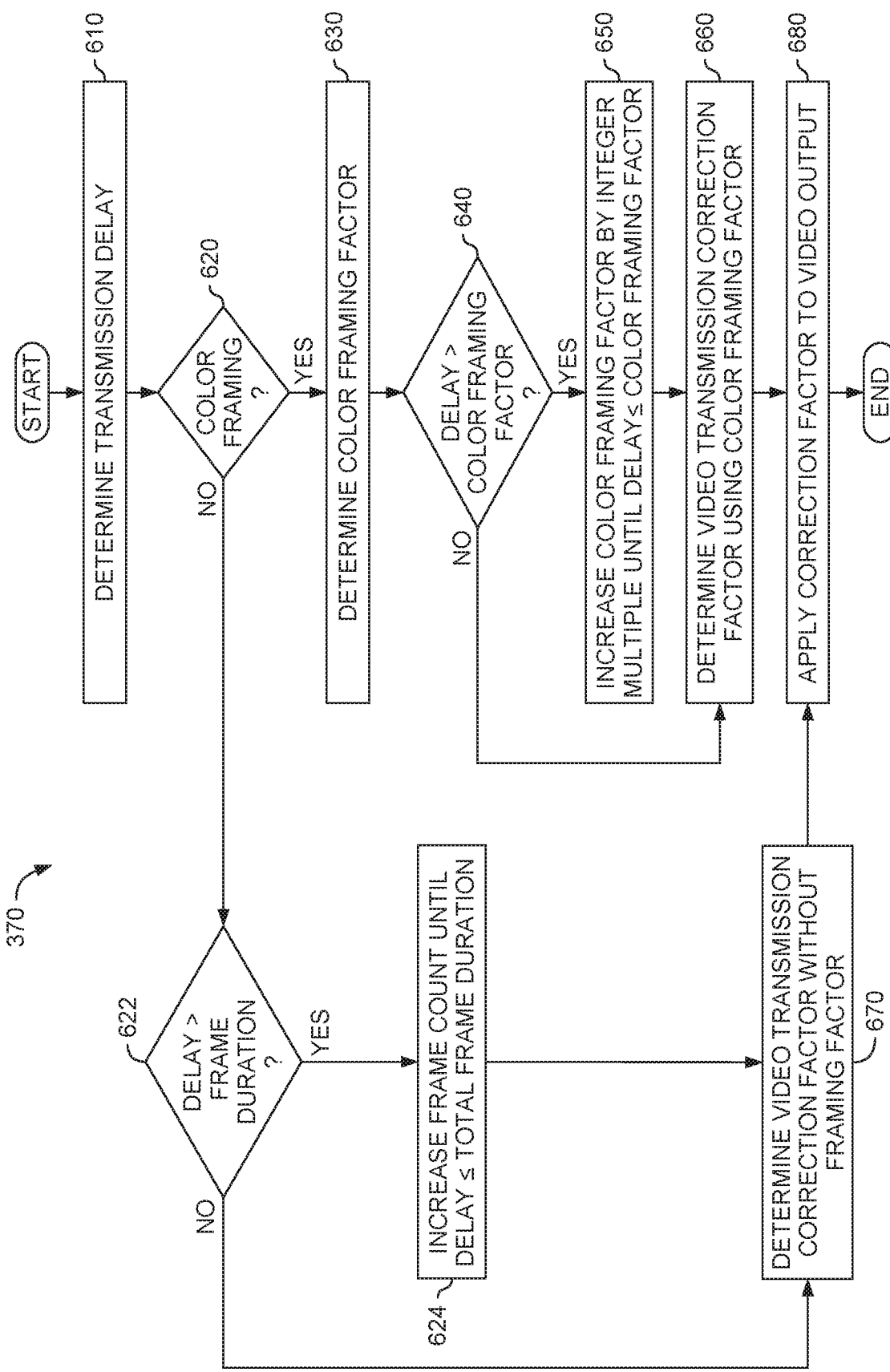
FIG. 6 is a flowchart for determining and applying a video transmission correction factor for a source device, according to one embodiment described herein.

FIG. 6 is a flow chart of a method for determining the video transmission correction factor for a source device based on the transmission delay, according to an embodiment. The video transmission correction factor is used to adjust the timing of video output from the source device, typically by delaying video transmission.

At block 610 the transmission delay is determined. This is described in more detail with reference to FIGS. 3-5, herein. At block 620, the source device analyzes whether the video signal includes color framing. Typically, a source device stores information indicating the video frame rate for the source video and indicating whether the color framing attribute is set. This information can be provided to the source device by the system reference point device via, for example, traditional video reference and time code or PTP.

If the color framing attribute indicates that the system does not use color framing, the method proceeds to block 622. At block 622 the source device determines whether the transmission delay is greater than the duration of a frame. If the transmission delay is not greater than the duration of a frame, the method proceeds to block 670. At block 670, the source device determines the video transmission correction factor based on the transmission delay. At block 680, the source devices uses the correction factor to align its output with the output of other source devices, typically by delaying the source device's output. The output of each source device could, for example, be delayed by a determined amount, with source devices having a shorter transmission delay to the system reference point device being delayed at the source device for longer than systems with a longer transmission delay, so that each signal is aligned upon arrival at the system reference point device.

For example, referring back to FIG. 2, assume source device 210 has a transmission delay of 10 ms, source device 212 has a transmission delay of 5 ms, and source device 214 has a transmission delay of 2 ms. Each source device could determine the appropriate video transmission correction factor by subtracting the delay from a frame duration. For example, assume a frame duration of 33.3 ms. The correction factor for source device 210 would be 33.3 ms−10 ms=23.3 ms. The correction factor for source device 212 would be 33.3 ms−5 ms=28.3 ms. The correction factor for source device 214 would be 33.3 ms−2 ms=31.3 ms. Source device 210 would then delay its video output by 23.3 ms. Source device 212 would delay its video output by 28.3 ms. And source device 214 would delay its video output by 31.3 ms. Because of the transmission delays, this results in the signals from all three source devices being aligned upon arrival at the system reference point device.

Returning to block 622, if the transmission delay is greater than the duration of a frame, the method proceeds to block 624. At block 624, the source device increases the frame count used when determining the video transmission correction factor until the delay is less than or equal to the total frame duration. For example, if the frame duration is 33.3 ms but the delay is 40 ms, the source device will use the duration of two frames (66.6 ms) when determining the video transmission correction factor at block 670. This ensures that the determined correction factor is a positive number smaller than the duration of a frame.

If, at block 620, the color framing attribute for the video signal indicates that the signal uses color framing, the method proceeds to block 630 where a color framing factor is determined. Color framing is used when signals are eventually converted to analog composite video. Color framing includes a short interval over which the color reference signal varies in phase. This interval is typically 1, 2 or 4 frames. For example, in National Television System Committee (NTSC) systems, typically used in North America and Japan, the interval is 2 frames. In Phase Alternating Line (PAL) systems, typically used in Europe, the interval is 4 frames.

The color framing factor is the time period corresponding to the color framing interval. For example, an NTSC signal has a color framing interval of 2 frames. The time period for these 2 frames can be determined based on the frame rate, also known to the source device. For example, if a video has a frame rate of 30 frames per second, the time period for each frame would be 33.3 ms. The color framing factor would be 2*33.3 ms=66.6 ms.

At block 640, the source device determines whether the transmission delay is greater than the color framing factor. If not, the method proceeds to block 660, where the source device determines the video transmission correction factor based on both the transmission delay and the coloring framing factor. The correction factor=color framing factor−transmission delay. For example, if the color framing factor is 66.6 ms and the transmission delay is 25 ms, the correction factor is 41.6 ms. At block 680 this correction factor is applied to the video output to align the video signals, typically by delaying the video output for 41.6 ms.

If the transmission delay is greater than the color framing factor, the method proceeds to block 650. At block 650, the source device increases the color framing factor by integer multiples until it is larger than the transmission delay. This ensures that the determined correction factor is a positive number smaller than the color framing factor. For example, if the color framing factor is 66.6 ms and the transmission delay is 130 ms, the color framing factor is doubled to 133.3 ms. This color framing factor is used at block 660 to determine the video transmission correction factor, here 133.3 ms−130 ms=3.3 ms.

In the preceding, reference is made to embodiments of the invention. However, it should be understood that the invention is not limited to specific described embodiments. Instead, any combination of the preceding features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method, comprising:
generating one or more timestamps at a system reference point device and at each of a plurality of source devices, wherein the plurality of source devices are communicatively coupled to the system reference point device via an Internet Protocol (IP) network;
determining a transmission delay between each of the source devices and the system reference point device over the IP network by exchanging the timestamps;
determining a video transmission correction factor for a first source device of the plurality of source devices, based on the transmission delay for the first source device and a color framing attribute of a first video signal; and
modifying, based on the video transmission correction factor, a time at which transmission of the first video signal is initiated from the first source device to the system reference point device over the IP network.

2. The method of claim 1, further comprising:
transmitting a first message from the system reference point device to the first source device over the IP network;
storing, at the system reference point device, a first timestamp of the one or more timestamps, wherein the first timestamp represents a time at which the system reference point device transmits the first message;
storing, at the first source device in response to receiving the first message, a second timestamp of the one or more timestamps, wherein the second timestamp represents a time at which the first source device receives the first message;
transmitting a second message from the first source device to the system reference point device over the IP network;
storing, at the first source device in response to transmitting the second message, a third timestamp of the one or more timestamps, wherein the third timestamp represents a time at which the first source device transmits the second message;
storing, at the system reference point device in response to receiving the second message, a fourth timestamp of the one or more timestamps, wherein the fourth timestamp represents a time at which the system reference point device receives the second message;
generating, at the system reference point device in response to receiving the second message, a third message comprising the first timestamp and the fourth timestamp; and
transmitting the third message from the system reference point device to the first source device, wherein the transmission delay between the first source device and the system reference point device is determined by the first source device using at least the first timestamp, the second timestamp, the third timestamp and the fourth timestamp.

3. The method of claim 1 wherein modifying the time at which the transmission of the first video signal is initiated comprises modifying a time at which transmission of a first pixel of a first line of a current color frame of the first video signal is initiated, and wherein modifying the time at which the transmission of the first video signal is initiated results in a first pixel of a first line of the first video signal arriving at the system reference point device within one line of a first pixel of a first line of a second video signal from a second source device of the plurality of source devices.

4. The method of claim 1, further comprising:
determining a color framing factor based the color framing attribute and a frame rate of the first video signal, wherein determining the video transmission correction factor is further based on a formula:

correction factor=color framing factor−transmission delay.

5. The method of claim 4 wherein determining the color framing factor is further based on the transmission delay.

6. The method of claim 1, further comprising adjusting a local clock at the system reference point device using an IP-based clock synchronization protocol.

7. A non-transitory computer readable storage medium comprising:
computer-readable program code for determining a video transmission correction factor, wherein, when executed by a computer processor, the computer-readable program code performs an operation comprising:
generating one or more timestamps at a system reference point device and at each of a plurality of source devices, wherein the plurality of source devices are communicatively coupled to the system reference point device via an Internet Protocol (IP) network;
determining a transmission delay between each of the source devices and the system reference point device over the IP network by exchanging the timestamps;
determining a video transmission correction factor for a first source device of the plurality of source devices, based on the transmission delay for the first source device and a color framing attribute of a first video signal; and
modifying, based on the video transmission correction factor, a time at which transmission of the first video signal is initiated from the first source device to the system reference point device over the IP network.

8. The computer program product of claim 7, wherein the operation further comprises:
transmitting a first message from the system reference point device to the first source device over the IP network;
storing, at the system reference point device, a first timestamp of the one or more timestamps, wherein the first timestamp represents a time at which the system reference point device transmits the first message;
storing, at the first source device in response to receiving the first message, a second timestamp of the one or more timestamps, wherein the second timestamp represents a time at which the first source device receives the first message;
transmitting a second message from the first source device to the system reference point device over the IP network;
storing, at the first source device in response to transmitting the second message, a third timestamp of the one or more timestamps, wherein the third timestamp represents a time at which the first source device transmits the second message;
storing, at the system reference point device in response to receiving the second message, a fourth timestamp of the one or more timestamps, wherein the fourth timestamp represents a time at which the system reference point device receives the second message;
generating, at the system reference point device in response to receiving the second message, a third message comprising the first timestamp and the fourth timestamp; and
transmitting the third message from the system reference point device to the first source device, wherein the transmission delay between the first source device and the system reference point device is determined by the first source device using at least the first timestamp, the second timestamp, the third timestamp and the fourth timestamp.

9. The computer program product of claim 7 wherein modifying the time at which the transmission of the first video signal is initiated comprises modifying a time at which transmission of a first pixel of a first line of a current color frame of the first video signal is initiated, and wherein modifying the time at which the transmission of the first video signal is initiated results in a first pixel of a first line of the first video signal arriving at the system reference point device within one line of a first pixel of a first line of a second video signal from a second source device of the plurality of source devices.

10. The computer program product of claim 7, wherein the operation further comprises:
determining a color framing factor based the color framing attribute and a frame rate of the first video signal, wherein determining the video transmission correction factor is further based on a formula:

correction factor=color framing factor−transmission delay.

11. The computer program product of claim 10 wherein determining the color framing factor is further based on the transmission delay.

12. The computer program product of claim 7, wherein the operation further comprises adjusting a local clock at the system reference point device using an IP-based clock synchronization protocol.

13. A media production studio, comprising:
a system reference point device;
an Internet Protocol (IP) network;
a plurality of source devices communicatively coupled to the system reference point device over the IP network in the media production studio, wherein the system reference point device and each of the source devices are configured to generate one or more timestamps, wherein each of the source devices is configured to determine a transmission delay between the source device and the system reference point device over the IP network by exchanging the timestamps; and
a first source device of the plurality of source devices configured to:
determine a video transmission correction factor based on the transmission delay between the first source device and the system reference point device and a color framing attribute of the first video signal, and
modify, based on the video transmission correction factor, a time at which the first source device initiates transmission of the first video signal to the system reference point device over the IP network.

14. The media production studio of claim 13:
wherein the system reference point device is configured to transmit a first message to the first source device over the IP network, wherein the system reference point device is configured to store a first timestamp of the one or more timestamps, wherein the first timestamp represents a time at which the system reference point device transmits the first message;
wherein the first source device is configured to store, in response to receiving the first message, a second timestamp of the one or more timestamps, wherein the second timestamp represents a time at which the first source device receives the first message, wherein the first source device is configured to transmit a second message to the system reference point device over the IP network, wherein the first source device is configured to store, in response to transmitting the second message, a third timestamp of the one or more timestamps, wherein the third timestamp represents a time at which the first source device transmits the second message;
wherein the system reference point device is configured to store, in response to receiving the second message, a fourth timestamp of the one or more timestamps, wherein the fourth timestamp represents a time at which the system reference point device receives the second message, wherein the system reference point device is configured to generate, in response to receiving the second message, a third message comprising the first timestamp and the fourth timestamp, wherein the system reference point device is configured to transmit the third message to the first source device; and wherein the first source device is configured to determine the transmission delay between the first source device and the system reference point device using at least the first timestamp, the second timestamp, the third timestamp and the fourth timestamp.

15. The media production studio of claim 13 wherein modifying the time at which the transmission of the first video signal is initiated comprises modifying a time at which transmission of a first pixel of a first line of a current color frame of the first video signal is initiated, and wherein modifying the time at which the transmission of the first video signal is initiated results in a first pixel of a first line of the first video signal arriving at the system reference point device within one line of a first pixel of a first line of a second video signal from a second source device of the plurality of source devices.

16. The media production studio of claim 13 wherein the first source device is configured to determine a color framing factor based the color framing attribute and a frame rate of the first video signal, wherein determining the video transmission correction factor is further based on a formula:

correction factor=color framing factor−transmission delay.

17. The media production studio of claim 13 wherein the system reference point device is configured to adjust a local clock using an IP-based clock synchronization protocol.

18. A method, comprising:
generating one or more timestamps at a system reference point device and at each of a plurality of source devices, wherein the plurality of source devices are communicatively coupled to the system reference point device via an Internet Protocol (IP) network;
determining a transmission delay between each of the source devices and the system reference point device over the IP network by exchanging the timestamps;
determining a video transmission correction factor for a first source device of the plurality of source devices, based on the transmission delay for the first source device; and
modifying, based on the video transmission correction factor, a time at which transmission of a first video signal is initiated from the first source device to the system reference point device over the IP network,
wherein modifying the time at which the transmission of the first video signal is initiated comprises modifying a time at which transmission of a first pixel of a first line of a current color frame of the first video signal is initiated, and wherein modifying the time at which the transmission of the first video signal is initiated results in a first pixel of a first line of the first video signal arriving at the system reference point device within one line of a first pixel of a first line of a second video signal from a second source device of the plurality of source devices.

19. The method of claim 18, further comprising:
transmitting a first message from the system reference point device to the first source device over the IP network;
storing, at the system reference point device, a first timestamp of the one or more timestamps, wherein the first timestamp represents a time at which the system reference point device transmits the first message;
storing, at the first source device in response to receiving the first message, a second timestamp of the one or more timestamps, wherein the second timestamp represents a time at which the first source device receives the first message;
transmitting a second message from the first source device to the system reference point device over the IP network;
storing, at the first source device in response to transmitting the second message, a third timestamp of the one or more timestamps, wherein the third timestamp represents a time at which the first source device transmits the second message;
storing, at the system reference point device in response to receiving the second message, a fourth timestamp of the one or more timestamps, wherein the fourth timestamp represents a time at which the system reference point device receives the second message;
generating, at the system reference point device in response to receiving the second message, a third message comprising the first timestamp and the fourth timestamp; and
transmitting the third message from the system reference point device to the first source device, wherein the transmission delay between the first source device and the system reference point device is determined by the first source device using at least the first timestamp, the second timestamp, the third timestamp and the fourth timestamp.

20. A non-transitory computer readable storage medium comprising:
computer-readable program code for determining a video transmission correction factor, wherein, when executed by a computer processor, the computer-readable program code performs an operation comprising:
generating one or more timestamps at a system reference point device and at each of a plurality of source devices, wherein the plurality of source devices are communicatively coupled to the system reference point device via an Internet Protocol (IP) network;
determining a transmission delay between each of the source devices and the system reference point device over the IP network by exchanging the timestamps;
determining a video transmission correction factor for a first source device of the plurality of source devices, based on the transmission delay for the first source device; and
modifying, based on the video transmission correction factor, a time at which transmission of a first video signal is initiated from the first source device to the system reference point device over the IP network,
wherein modifying the time at which the transmission of the first video signal is initiated comprises modifying a time at which transmission of a first pixel of a first line of a current color frame of the first video signal is initiated, and wherein modifying the time at which the transmission of the first video signal is initiated results in a first pixel of a first line of the first video signal arriving at the system reference point device within one line of a first pixel of a first line of a second video signal from a second source device of the plurality of source devices.

21. The computer program product of claim 20, wherein the operation further comprises:
- transmitting a first message from the system reference point device to the first source device over the IP network;
- storing, at the system reference point device, a first timestamp of the one or more timestamps, wherein the first timestamp represents a time at which the system reference point device transmits the first message;
- storing, at the first source device in response to receiving the first message, a second timestamp of the one or more timestamps, wherein the second timestamp represents a time at which the first source device receives the first message;
- transmitting a second message from the first source device to the system reference point device over the IP network;
- storing, at the first source device in response to transmitting the second message, a third timestamp of the one or more timestamps, wherein the third timestamp represents a time at which the first source device transmits the second message;
- storing, at the system reference point device in response to receiving the second message, a fourth timestamp of the one or more timestamps, wherein the fourth timestamp represents a time at which the system reference point device receives the second message;
- generating, at the system reference point device in response to receiving the second message, a third message comprising the first timestamp and the fourth timestamp; and
- transmitting the third message from the system reference point device to the first source device, wherein the transmission delay between the first source device and the system reference point device is determined by the first source device using at least the first timestamp, the second timestamp, the third timestamp and the fourth timestamp.

22. A media production studio, comprising:
- a system reference point device;
- an Internet Protocol (IP) network;
- a plurality of source devices communicatively coupled to the system reference point device over the IP network in the media production studio, wherein the system reference point device and each of the source devices are configured to generate one or more timestamps, wherein each of the source devices is configured to determine a transmission delay between the source device and the system reference point device over the IP network by exchanging the timestamps; and
- a first source device of the plurality of source devices configured to:
  - determine a video transmission correction factor based on the transmission delay between the first source device and the system reference point device, and
  - modify, based on the video transmission correction factor, a time at which the first source device initiates transmission of a first video signal to the system reference point device over the IP network,
- wherein modifying the time at which the transmission of the first video signal is initiated comprises modifying a time at which transmission of a first pixel of a first line of a current color frame of the first video signal is initiated, and wherein modifying the time at which the transmission of the first video signal is initiated results in a first pixel of a first line of the first video signal arriving at the system reference point device within one line of a first pixel of a first line of a second video signal from a second source device of the plurality of source devices.

23. The media production studio of claim 22:
- wherein the system reference point device is configured to transmit a first message to the first source device over the IP network, wherein the system reference point device is configured to store a first timestamp of the one or more timestamps, wherein the first timestamp represents a time at which the system reference point device transmits the first message;
- wherein the first source device is configured to store, in response to receiving the first message, a second timestamp of the one or more timestamps, wherein the second timestamp represents a time at which the first source device receives the first message, wherein the first source device is configured to transmit a second message to the system reference point device over the IP network, wherein the first source device is configured to store, in response to transmitting the second message, a third timestamp of the one or more timestamps, wherein the third timestamp represents a time at which the first source device transmits the second message;
- wherein the system reference point device is configured to store, in response to receiving the second message, a fourth timestamp of the one or more timestamps, wherein the fourth timestamp represents a time at which the system reference point device receives the second message, wherein the system reference point device is configured to generate, in response to receiving the second message, a third message comprising the first timestamp and the fourth timestamp, wherein the system reference point device is configured to transmit the third message to the first source device; and
- wherein the first source device is configured to determine the transmission delay between the first source device and the system reference point device using at least the first timestamp, the second timestamp, the third timestamp and the fourth timestamp.

* * * * *

UNITED STATES PATENT AND TRADEMARK OFFICE
CERTIFICATE OF CORRECTION

PATENT NO. : 10,595,075 B2
APPLICATION NO. : 15/669463
DATED : March 17, 2020
INVENTOR(S) : Craig L. Beardsley et al.

It is certified that error appears in the above-identified patent and that said Letters Patent is hereby corrected as shown below:

In the Claims

Column 12, Line 56, in Claim 4, delete "based the color" and insert -- based on the color --, therefor.

Column 14, Line 8, in Claim 10, delete "based the color" and insert -- based on the color --, therefor.

Column 15, Line 27, in Claim 16, delete "based the color" and insert -- based on the color --, therefor.

Signed and Sealed this
Nineteenth Day of May, 2020

Andrei Iancu
*Director of the United States Patent and Trademark Office*